United States Patent
Cole

(10) Patent No.: US 9,438,052 B1
(45) Date of Patent: Sep. 6, 2016

(54) MOBILE DEVICE HOLDER-CHARGER

(71) Applicant: Ellen Louise Cole, New York City, NY (US)

(72) Inventor: Ellen Louise Cole, New York City, NY (US)

( * ) Notice: Subject to any disclaimer, the term of this patent is extended or adjusted under 35 U.S.C. 154(b) by 0 days.

(21) Appl. No.: 14/545,414

(22) Filed: May 1, 2015

Related U.S. Application Data

(60) Provisional application No. 62/139,577, filed on Mar. 27, 2015.

(51) Int. Cl.
*H02J 7/00* (2006.01)

(52) U.S. Cl.
CPC ............ *H02J 7/0044* (2013.01); *H02J 7/0052* (2013.01); *H02J 2007/0062* (2013.01)

(58) Field of Classification Search
USPC .......................................... 320/114
See application file for complete search history.

(56) References Cited

U.S. PATENT DOCUMENTS

| | | | |
|---|---|---|---|
| 2,986,718 A | 5/1961 | Bender, Jr. | |
| 6,034,505 A * | 3/2000 | Arthur | H01M 2/1022 320/113 |
| 6,687,513 B1 | 2/2004 | Hsu Lid | |
| 6,939,150 B1 | 9/2005 | Lanni | |
| 6,993,289 B2 | 1/2006 | Janik | |
| D607,816 S | 1/2010 | Chen | |
| 7,738,247 B2 | 6/2010 | Choi | |
| 7,839,118 B2 | 11/2010 | Carnevali | |
| 8,366,461 B2 * | 2/2013 | Lee | H01R 24/30 439/131 |
| 8,371,872 B2 | 2/2013 | Zhou | |
| 8,378,625 B2 | 2/2013 | Gourley | |
| 8,717,044 B2 | 5/2014 | Sims | |
| 8,758,031 B2 | 6/2014 | Cheng | |
| 2003/0137276 A1 | 7/2003 | Lin | |
| 2003/0218445 A1 | 11/2003 | Behar | |
| 2004/0251873 A1 * | 12/2004 | Simoes | H02J 7/0044 320/114 |
| 2006/0125445 A1 | 6/2006 | Cao et al. | |
| 2006/0292343 A1 * | 12/2006 | Sellers | B32B 3/10 428/131 |
| 2008/0019082 A1 | 1/2008 | Krieger et al. | |
| 2008/0150480 A1 | 6/2008 | Navid | |
| 2008/0157712 A1 | 7/2008 | Garcia | |
| 2009/0015198 A1 | 1/2009 | Brandenburg | |
| 2009/0237031 A1 | 9/2009 | Mcsweyn | |
| 2010/0033127 A1 | 2/2010 | Griffin, Jr. | |
| 2011/0227535 A1 * | 9/2011 | Caskey | H01R 13/6675 320/111 |
| 2012/0005495 A1 | 1/2012 | Matsuoka | |
| 2013/0112824 A1 | 5/2013 | Chen et al. | |
| 2013/0150134 A1 | 6/2013 | Pliner et al. | |
| 2013/0159583 A1 | 6/2013 | Struthers et al. | |
| 2014/0136863 A1 | 5/2014 | Fritchman | |
| 2014/0244882 A1 | 8/2014 | Struthers et al. | |

FOREIGN PATENT DOCUMENTS

| | | |
|---|---|---|
| CN | 102694407 A | 9/2012 |
| EP | 1387448 B1 | 5/2009 |

\* cited by examiner

*Primary Examiner* — Robert Grant

(57) ABSTRACT

Mobile device holder-charger with a rotating three prong plug that allows for use in either horizontal or vertical outlets. There is a bracket to secure the phone. The device can be used on a support surface with a grounded extension cord. There is non-skid material disposed on the bottom. The device is a one piece unit for easy portability.

1 Claim, 2 Drawing Sheets

MOBILE DEVICE HOLDER-CHARGER

BACKGROUND OF THE INVENTION

There is a need for a better way to charge a phone. Very often I find outlets that are not near a table or suitable place to rest the phone. There is a risk to having a phone on the ground where it could be stepped on. Wrapping the charging wire around the outlet to dangle the phone can damage the charging wire from the weight of the phone. Therefore, the one piece mobile device holder-charger which can support the phone upright in both horizontal and vertical outlets. Other holders can be used only with a vertical socket outlet. The bracket helps secure phones of various sizes.

The following patents are the inspiration to the development of my device:

1. The rotating the plug was from patents: U.S. Pat. No. 1,241,030A Pub Sep. 25, 1917 Wilfred Schade Swivel electric connection and U.S. Pat. No. 8,371,872B2 Pub Feb. 12, 2913 Jianlin Zhou Assignee Mig Electronic Industrial Co., Ltd Rotating plug
2. The holder from U.S. Pat. No. 8,378,625B2 Pub Feb. 19, 2013 James Robert Gourley
3. Bracket—U.S. Pat. No. D690,707 S1 Pub Oct. 1, 2013 Kenneth Minn, David E. Yao Spring Loaded Expandable Holder Grip Bracket assignee Kenu, LLC
4. Folding three prongs: patent # EP1387448 B1 & as U.S. Pat. No. 6,939,150 Pub May 1, 2009 Thomas W. Lanni and U.S. Pat. No. 8,096,817 B2 (also as # US 20110097914) Pub Jan. 17, 2012 Yu-Lung Lee, Jung-Hui Hsu, Ming-Chou Kuo, Mei-Ju Lin
5. Non-skid material: patent # US 20060292343 A1 Pub Jun. 28, 2005 Jenna Sellers
6. Electronics several patents: U.S. Pat. No. 8,717,044B2, #USCN102694407A and #US20140136863A1 for USB and phone charger plugs.

Often I need to charge my computer at the same time, therefore, the addition of a USB Port on the top of the holder. This device answers this need of a better way to charge a phone. Other holders do not have all the features: rotating three prong plug, USB Port, non-skid friction material, and securing bracket.

SUMMARY

The Mobile device holder-charger is a composite consisting of a rotating three prong plug, USB Port, holder to rest the phone on, charger plug, bracket and non-skid friction material on the bottom. It is this combination of features that differentiates this holder-charger from any others.

The location of the bracket on the bottom of the holder with the expandable sides facing upward allows for support of the item being charged and helps to keep the phone from falling off the charger. When in a retracted position, the bracket arms add to the rectangular shape of the closed holder. The rotating plug gives flexibility to allow for use in differently orientated outlets in either vertical or horizontal positions to enable the phone being charged to remain in an upright position. The three prong plug provides a more secure attachment to the outlet than a two prong plug. Two items can be charged at one time due to the USB Port on the top. The non-skip friction material on the bottom helps keep the mobile device more secure if used on a support surface with an extension cord. There is enough space in the holder to allow for most covers to be left on when charging a device or a mobile phone. The charger-holder is compact, light weight and easy to carry.

Figure 1:
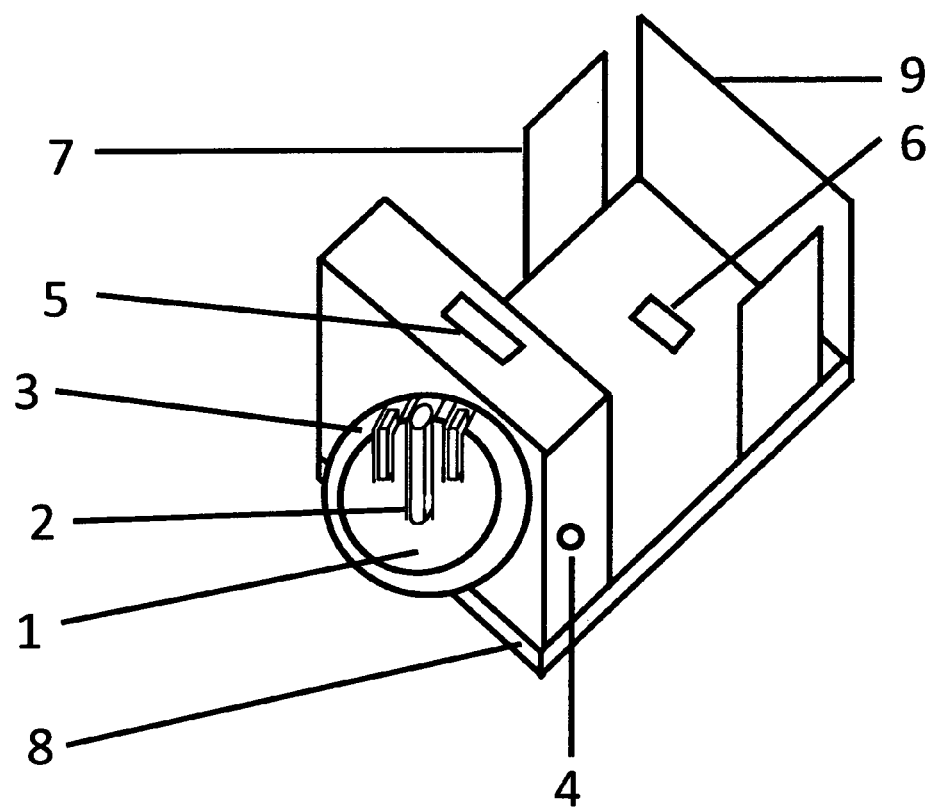
FIG. 1 represents an open view of the mobile device holder-charger. The prongs 2 are extended in the vertical position. The bracket 7 is shown in an expanded position.
Figure 2:
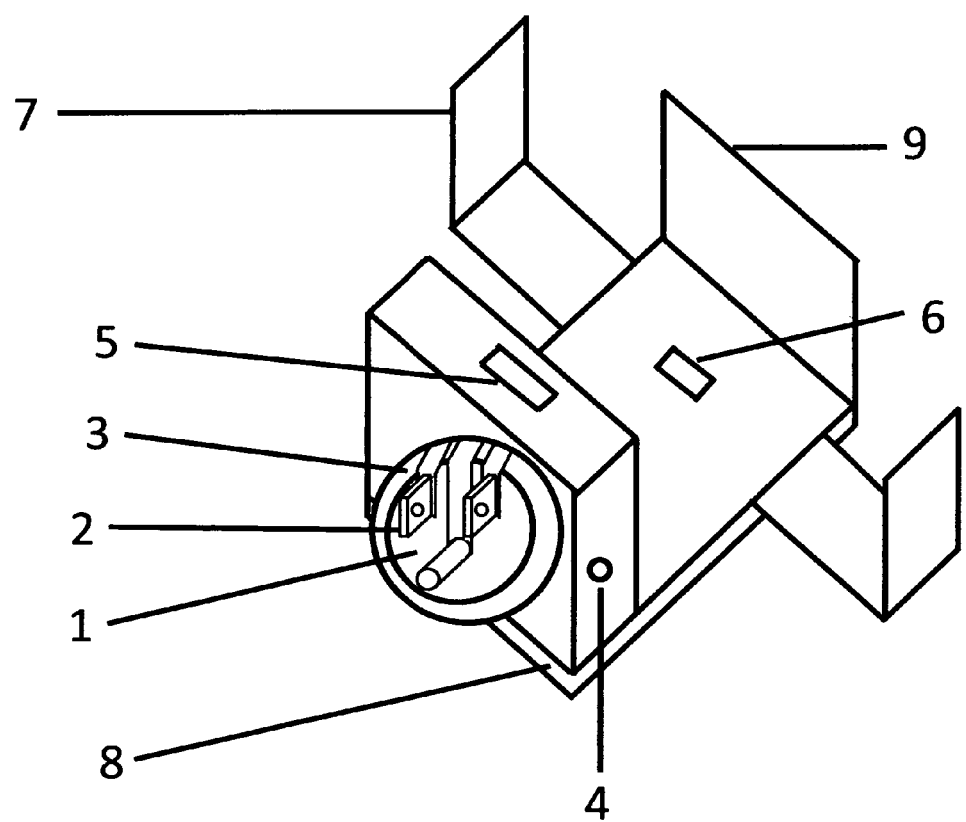
FIG. 2 represents a closed view of the mobile device holder-charger. The prongs 2 are folded and the bracket 7 is contracted.

The following numbers represent the various parts of the mobile device holder-charger:
1. Front plug area
2. Prongs of plug
3. Rim around the plug to turn the plug.
4. Push button for the rotation of the plug.
5. USB Port
6. Charger plug
7. Spring-loaded bracket to secure the device being charged.
8. Non-skid friction material disposed on the bottom.
9. Back of the device

DETAILED DESCRIPTION

The Mobile device holder-charger is a composite of a rotating three prong plug, USB port, holder to rest the phone on, phone charger plug, bracket and non-skid friction material. It is this composite that I claim as my invention.

The rotating three prong plug has a backing or plate that allows the front plug area 1 to be released and rotate left or right of the vertical position to adjust for outlets installed vertically or horizontally, keeping the charging phone in an upright position. A push button 4 on the side allows the plug to turn and then lock in place. There is a rim 3 around the exterior of the plug with which to turn the plug. An inner fixed plate transfers the electrical current from the outer plate of the plug to the inner electronics. The inner plate has different contact positions to correspond to the rotation of the plug. The prongs 2 of the plug are in a fixed position or can be folded. There is non-skid friction material 8 disposed on the bottom. The electronics is referenced on U.S. Pat. No. 8,717,044B2, #USCN102694407A and #US20140136863A1 for USB and phone charger plugs.

There is a USB port 5 on the top so that a second device can be charged at the same time. The holder has an expanding bracket 7 mounted on the bottom of the holder such that the sides of the bracket face upward and surround the outer edges of the inserted phone. Thus, the phone is surrounded on four sides: front, back and bracket arms to make the phone secure. Space around the charger plug 5 should allow for most phone covers to remain on the phone while it is charging. The charger plug 5 is positioned to allow for the depth of most covers. There is about a half inch deep outer rim 2 around the face of the plug to grip and turn the plug when the push stop button 3 is pressed. The height of the sides and the bracket arms should be approximately one and a quarter inches. The width of the holder should be approximately one and a half inches. The spring-loaded bracket 6 can expand approximately five inches to accommodate various size phones and devices and contract to the width of the holder. When closed, the holder-charger device forms a rectangular shape for easy portability. It is the sum of the parts and features that I claim as my mobile device holder-charger.

The invention claimed is:

1. A holder-charger for charging a mobile device comprising:

an attached rotatable plug with push stop release, the plug useable in two or three prong outlets, wherein two prongs unfold and fold independently of the ground prong, and the ground prong folds and unfolds separately;

rotation of the plug by turning an approximate half inch outer rim side of plug, the plug being rotatable to keep the device being charged in an upright position;

the holder-charger size approximately one and one quarter inches high by one and one half inches wide, wherein spring-loaded bracket expands to size of device being held or charged, the bracket contracts to width of holder-charger, and in a closed position forms a rectangular shape;

the holder-charger also includes a phone charger plug, a USB port on top, a non-skip pad on bottom of holder, and space for accommodating phones while their covers remain on.

\* \* \* \* \*